United States Patent
Kollur et al.

(10) Patent No.: US 10,432,548 B2
(45) Date of Patent: Oct. 1, 2019

(54) WORKLOAD DEPLOYMENT IN COMPUTING NETWORKS

(71) Applicant: HEWLETT PACKARD ENTERPRISE DEVELOPMENT LP, Houston, TX (US)

(72) Inventors: Sripadwallabha Dattatraya Kollur, Bangalore (IN); Swaroop Jayanthi, Bangalore (IN); Chetan V P, Bangalore (IN); Nikunj Aggarwal, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 203 days.

(21) Appl. No.: 15/172,688

(22) Filed: Jun. 3, 2016

(65) Prior Publication Data

US 2017/0034070 A1    Feb. 2, 2017

(30) Foreign Application Priority Data

Jul. 31, 2015 (IN) .......................... 3994/CHE/2015

(51) Int. Cl.
*H04L 12/911* (2013.01)

(52) U.S. Cl.
CPC ............ *H04L 47/70* (2013.01); *H04L 47/745* (2013.01); *H04L 47/781* (2013.01)

(58) Field of Classification Search
CPC ..... H04L 47/70; H04L 47/745; H04L 47/781; H04L 67/1012; H04L 67/1014;
(Continued)

(56) References Cited

U.S. PATENT DOCUMENTS 8,321,554 B2 * 11/2012 Dickinson ................. G06F 8/61
   709/220
8,745,205 B2   6/2014 Anderson et al.
(Continued)

FOREIGN PATENT DOCUMENTS

WO    2014/150992 A1    9/2014

OTHER PUBLICATIONS

Definition of Procesor by Merriam-Webster Dictionary, 2018 Merriam-Webster Incorporated, https://www.merriam-webster.com.*
(Continued)

*Primary Examiner* — Thomas J Dailey
*Assistant Examiner* — Lam H Duong
(74) *Attorney, Agent, or Firm* — Brooks, Cameron & Huebsch, PLLC (57) ABSTRACT

Techniques of workload deployment in a computing network are described. For example a computing system may receive a workload deployment request for deployment of a workload on resources of the computing network. The computing system may determine unavailability of interoperable resources for deployment of the workload, based on interoperability information associated with each of the resources, and identify at least one set of resources for deployment of the workload, where deploying the workload on each set of resources from amongst the at least one set of resources comprises changing configuration of at least one resource included within corresponding set of resources. The computing system may further rate each of the set of resources based on deployment parameters, and select a first set of resources from amongst the at least one set of resources for deployment of the workload based on the rank of each of the set of resources.

15 Claims, 5 Drawing Sheets

(58) Field of Classification Search
CPC ............. H04L 67/1023; H04L 67/1025; H04L 67/1029; H04L 67/1031; H04L 41/5054; G06F 2212/1004
USPC ........................................................ 709/226
See application file for complete search history.

(56) References Cited

U.S. PATENT DOCUMENTS

| | | | |
|---|---|---|---|
| 8,924,561 B2* | 12/2014 | Brown | G06F 9/5072 709/226 |
| 9,858,166 B1* | 1/2018 | Gong | G06F 16/284 |
| 2008/0147744 A1* | 6/2008 | Barmettler | G06F 16/217 |
| 2010/0058352 A1* | 3/2010 | Esfahany | G06F 9/505 718/105 |
| 2011/0173628 A1 | 7/2011 | Gargash et al. | |
| 2012/0131181 A1 | 5/2012 | Binder et al. | |
| 2012/0246318 A1* | 9/2012 | Mohammed | G06F 9/5061 709/226 |
| 2013/0174168 A1* | 7/2013 | Abuelsaad | G06F 9/5072 718/102 |
| 2014/0081691 A1 | 3/2014 | Wendell | |
| 2016/0259660 A1* | 9/2016 | Gaurav | G06F 9/45558 |
| 2016/0259665 A1* | 9/2016 | Gaurav | G06F 9/4856 |
| 2017/0003951 A1* | 1/2017 | Newell | G06F 8/65 |
| 2017/0034023 A1* | 2/2017 | Nickolov | H04L 43/0817 |
| 2017/0235570 A1* | 8/2017 | Catalano | G06Q 10/0631 717/101 |
| 2018/0181471 A1* | 6/2018 | Panta | G06F 11/1076 |

OTHER PUBLICATIONS

Lewis, G., "Standards in Cloud Computing Interoperability," (Research Paper), Mar. 4, 2013, 4 pages.

Nachmani, O., "5 Key Essentials of Cloud Workloads Migration," (Research Paper), May 13, 2013, 4 pages.

* cited by examiner

WORKLOAD DEPLOYMENT IN COMPUTING NETWORKS

CROSS-REFERENCE TO RELATED APPLICATION

This application is a U.S. Utility Application of and claims priority to Indian Patent Application No. 3994/CHE/2015, filed on Jul. 31, 2015, and entitled "WORKLOAD DEPLOYMENT IN COMPUTING NETWORKS", the entire content of which is hereby incorporated in its entirety.

BACKGROUND

Computing networks include different types of resources to execute and process various types of workloads. The resources may include hardware resources, such as servers, host bus adapters, network adapters, switches, laptops, desktops, game consoles, and storage devices, and may also include software resources, such as versions of operating systems, applications, hypervisors, and firmware. Each resource may include different components and different processing capabilities. For example, one resource may be able to execute certain workloads in a more efficient manner than another resource due to differences in configuration and capabilities of the resources. In some situations, more than one resource may also be commonly utilized to execute a particular workload. Therefore, depending on the processing requisites of a workload, the workload may be deployed onto one or more resources of the computing network.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to techniques of deployment of workloads onto different resources of a computing network. Generally, each resource within the computing network may have a predefined configuration, where the configuration is indicative of the capabilities of the resource. For example, the configuration may either correspond to a firmware or logical capability of either driving hardware components of the resources, or providing various functionalities to the resources. Based on the configuration of each resource, the resource may be identified to be interoperable with other resources within the computing network. Further, based on the interoperability between resources, deployment of a workload onto one or more resources of the computing network may be determined.

Interoperability of resources is generally determined manually by operators by analyzing interoperability information associated with each resource provided by vendors, developers, or manufacturers of the resource. Interoperability may also be determined automatically if the interoperability information is expressed in Open Interoperability Format (OIF) for analysis by a computing system. While the manual and automated methods of determining interoperability allow determination of resources capable of commonly executing workloads, various workloads remain unexecuted due to unavailability of interoperable resources.

According to an example implementation of the present subject matter, techniques of deployment of workloads in a computing network have been described. The described techniques may allow deployment of workloads when interoperable resources are unavailable to execute one or more workloads. On one hand the described techniques may allow deployment of new workloads while interoperable resources are unavailable, on the other, the described techniques may allow migration of workloads from one set of resources to another set of resources while some of resources within the another set of resources are non interoperable for migration and deployment of the workloads.

The techniques described herein can be implemented in a variety of resources, such as servers, network adapters, laptops, desktops, operating systems, hypervisors, and firmware, and/or included with various types of computing networks, such as a cloud computing network and distributed computing network.

In an example implementation of the present subject matter, a workload deployment request may be received for deployment of the workload onto resources of the computing network. The workload deployment request for deployment of the workload may include deployment details associated with the workload. In an implementation, the deployment details may specify configuration of resources, like a workload Id., product name, a vender name, a product type, a product version, or any other suitable field associated with deployment of the workload. In an example, the deployment details may include workload Id. as '123456', Operating system as 'OS1', Hypervisor as 'H1', and storage as 'ST1'.

The computing network may include multiple such set of resources that may be interoperable and can be utilized for the deployment of the workload. It would be noted that for deployment of any workload, a set of resources that are interoperable may be utilized. However, it may also happen that no such set of resources is available that may work interoperably for deployment and execution of the workload.

In example scenarios when it is determined that that no such set of interoperable resources is available for deployment and execution of a workload, according to an implementation of the present subject matter, at least one set of resources may be identified where the received workload may be deployed by changing the configuration of one or more resources. In other words, at least one set of resources may be identified where, by upgrading or downgrading the configuration of at least one resource, the received workload can be deployed.

From amongst the at least one set of resources, a first set of resources may be selected based on rating of each set of resources within the at least one set of resources. In one implementation of the present subject matter, each set of resources within the at least one set of resources may be rated based on deployment parameters. The deployment parameters may indicate the extent of changes to be performed in resources for deployment of the workload.

In an example, the deployment parameters may include at least one attribute including utilization of the plurality of resources, number of existing workloads to be migrated for deployment of the workload, number of resources to be upgraded to deploy the workload, number of resources to be downgraded to deploy the workload, and priority for deployment of the workload.

Accordingly, based on the selection of the first set of resources, the received workload may be deployed in the computing network, even in situations when no interoperable resource is available for deployment of the received workload. It would be noted that while the above described techniques may be implemented for deployment of new workloads, the described techniques may also be implemented for migration of workloads from one set of resources to another based on interoperability of the available resources. In situations where interoperable resources are not available for the purpose of migration, change in configuration of resources may be undertaken for migration and deployment of the workload from one set to another set of resources.

The above techniques are further described with reference to FIG. 1 to FIG. 5. It may be noted that the description and the figures merely illustrate the principles of the present subject matter along with examples described herein and, may be not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

Figure 1:
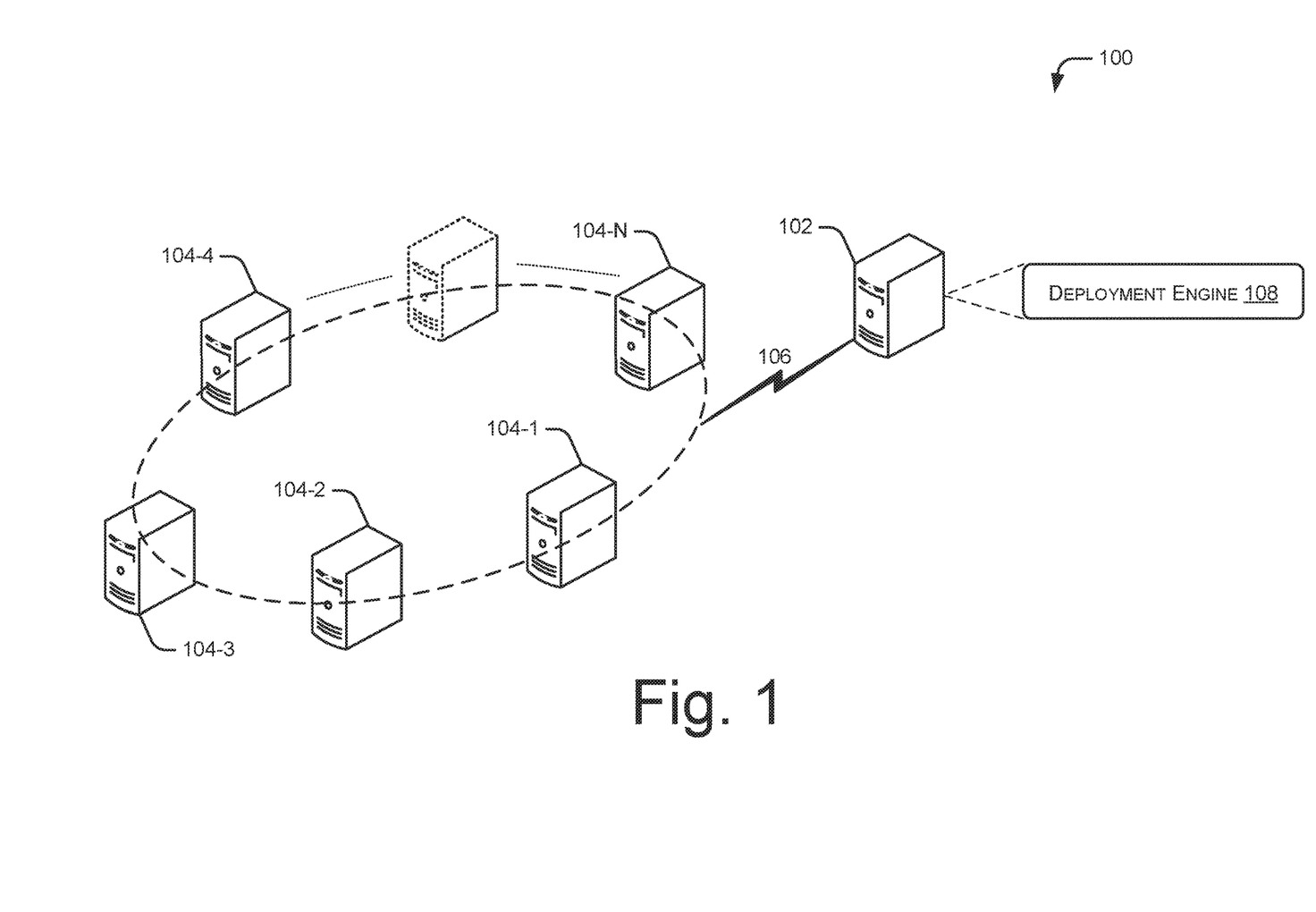
FIG. 1 illustrates an example computing network, implementing a computing system, according to an example implementation of the present subject matter.

FIG. 1 an example computing network 100, implementing a computing system 102, according to an example implementation of the present subject matter. The computing network 100 may either be a public distributed environment, or may be a private distributed environment. The computing system 102 may also be coupled with one or more resources 104-1, 104-2, 104-3, 104-4, . . . , 104-N, through a communication link 106. For the sake of explanation, the one or more resources 104-1, 104-2, 104-3, 104-4, . . . , 104-N have been commonly referred to as the resources 104, and have been individually referred to as a resource 104.

According to an example implementation of the present subject matter, the computing system 102 may be implemented as, but is not limited to, a server, a workstation, a desktop computer, a laptop, a smart phone, a personal digital assistant (PDAs), a tablet, a virtual host, an application, and the like. The computing system 102 may manage the one or more resources 104 for workload deployment and execution.

Similarly, each resource 104 may be a physical or logical entity of the computing network 100 that can be utilized for deployment and execution of a workload. By way of example and not limitation, the resource may either be a hardware resource, or a software resource, such as a storage array, a network switch, a host bus adapter card, a network adapter, a desktop, a laptop, a smartphone, a PDA, a logical network, a subnet, a network port, a gateway, a router, an operating system, an application, a hypervisor, and a firmware.

The communication link 106 may be served by a private or a public communication network. The communication network may be a wireless network, a wired network, or a combination thereof. The communication network may also be an individual network or a collection of many such individual networks, interconnected with each other and functioning as a single large network, e.g., the Internet or an intranet. The communication network may be implemented as one of the different types of networks, such as intranet, local area network (LAN), wide area network (WAN), and such. The communication network may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The communication network may also include individual networks, such as, but are not limited to, Global System for Communication (GSM) network, Universal Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the implementation, the communication network may include various network entities, such as base stations, gateways and routers; however, such details have been omitted to maintain the brevity of the description. Further, it may be understood that communication between the computing system 102, the resources 104, and other entities may take place based on the communication protocol supported by the communication link 106.

In an example implementation of the present subject matter, the computing system 102 may include a deployment engine 108. The deployment engine 108 may facilitate deployment and execution of workload onto one or more resources 104. Further, the deployment engine 108 may also facilitate migration of an existing workload from one set of resources 104 to another set of resources 104.

Although the computing system 102 may perform the above mentioned functionality in the described example implementation, the computing system 102 may also perform other functionalities and may include different components. Such example functionalities and example components have been further described in more detail in reference to FIG. 2.

Figure 2:
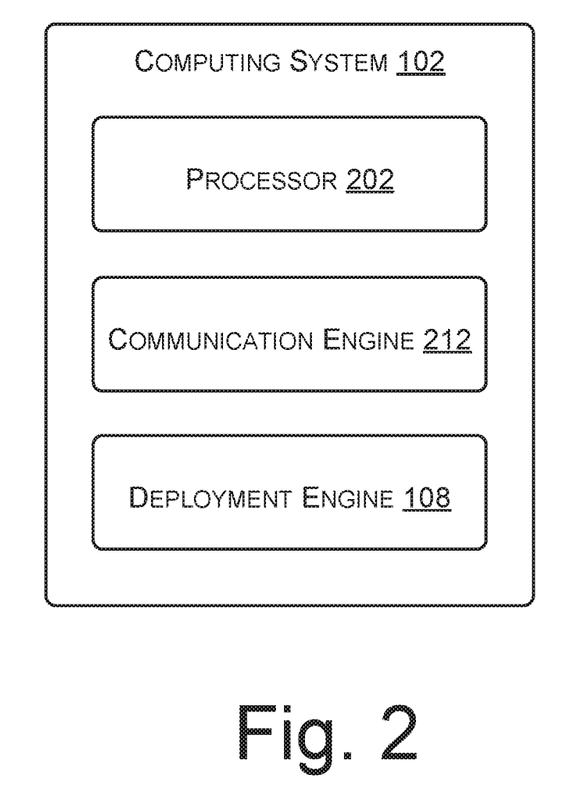
FIG. 2 illustrates the computing system, according to an example implementation of the present subject matter.

FIG. 2 illustrates a computing system 102, according to an example implementation of the present subject matter. In one implementation of the present subject matter, the computing system 102 may manage deployment and execution of workloads on the one or more resources 104, through the communication link 106. In another example implementation, the computing system 102 may include processor(s) 202, a communication engine 212, and a deployment engine 108. The communication engine 212 may receive workload deployment request for deployment and execution of workloads. The deployment engine 108 may perform the activity of determining resources 104 onto which the workload can be deployed, in situations of unavailability of the interoperable resources 104. The manner in which the communication engine 212 and the deployment engine 108 may operate, may be described in detail in reference to FIG. 3.

Figure 3:
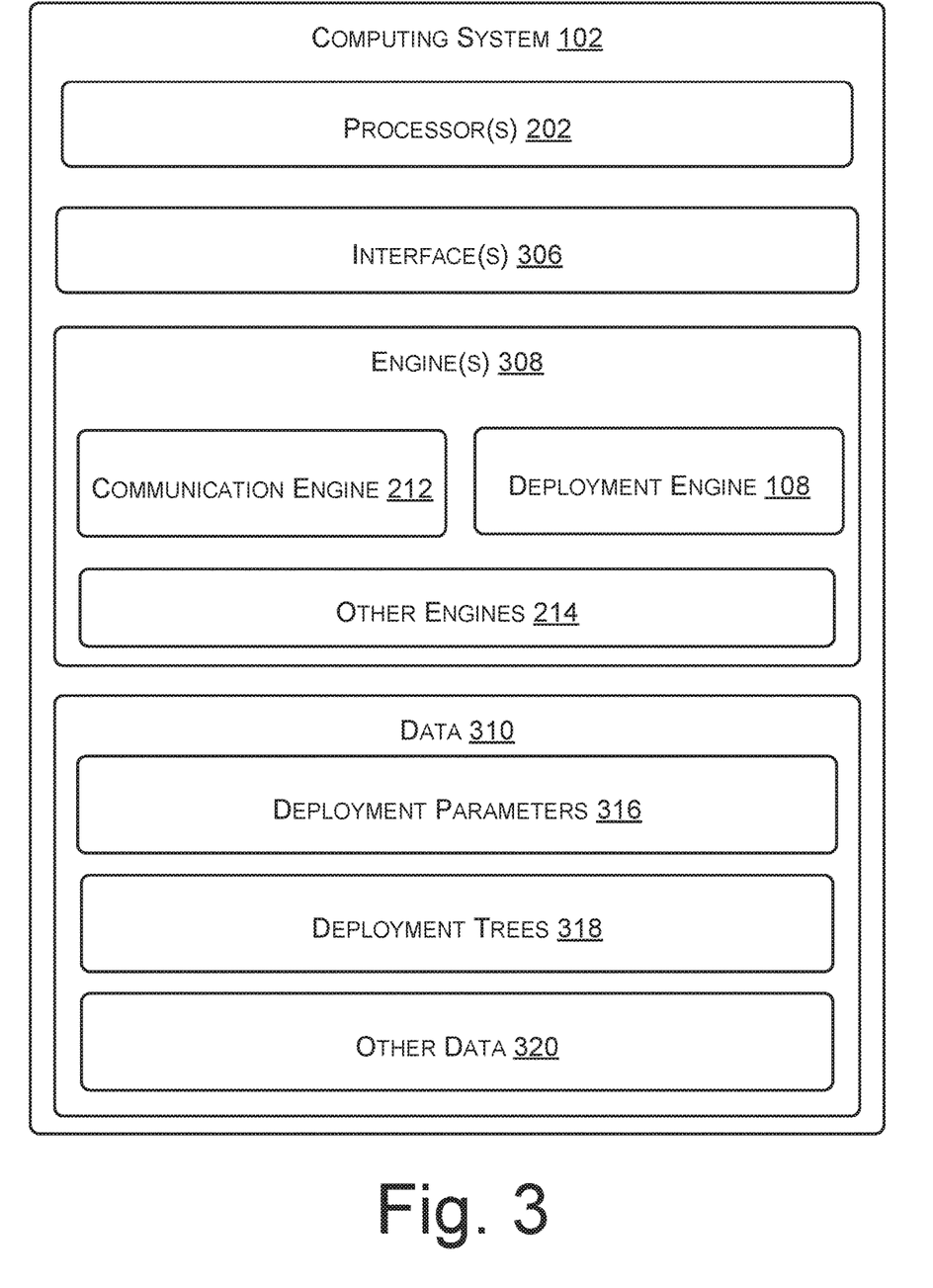
FIG. 3 illustrates the computing system, according to an example implementation of the present subject matter.

FIG. 3 illustrates the computing system 102, according to another implementation of the present subject matter. In an implementation, the example computing system 102 may include the processor(s) 202. The processor(s) 202 may be implemented as microprocessor(s), microcomputer(s), microcontroller(s), digital signal processor(s), central processing unit(s), state machine(s), logic circuit(s), and/or any device(s) that manipulates signals based on operational instructions. Among other capabilities, the processor(s) 202 may fetch and execute computer-readable instructions stored in a memory. The functions of the various elements shown in the figure, including any functional blocks labeled as "processor(s)", may be provided through the use of dedicated hardware as well as hardware capable of executing machine readable instructions.

Further, the computing system 102 may also include interface(s) 306. The interface(s) 306 may include a variety of machine readable instructions-based interfaces and hardware interfaces that allow the computing system 102 to interact with the resources 104. Further, the interface(s) 306 may enable the computing system 102 to communicate with other communication and computing devices, such as network entities, web servers and external repositories.

Further, the computing system 102 includes engine(s) 308 and data 310. The engine(s) 308 may be communicatively coupled to the processor(s) 202. The engine(s) 308, amongst other things, may include routines, programs, objects, components, data structures, and the like, which perform particular tasks or implement particular abstract data types. The engine(s) 308 may further include modules that supplement applications on the computing system 102, for example, modules of an operating system. Further, the engine(s) 308 may also include internal or external memory for the purpose of storage of the routines, programs, objects, components, and data structures.

The data 310 serves, amongst other things, as a repository for storing data that may be fetched, processed, received, or generated by the engine(s) 308. Although the data 310 is shown internal to the computing system 102, it may be understood that the data 310 may reside in an external repository (not shown in the figure), which may be communicatively coupled to the computing system 102. The computing system 102 may communicate with the external repository through the interface(s) 306 to obtain information from the data 310.

In an implementation, the engine(s) 308 of the computing system 102 may include the deployment engine 108, a communication engine 212, and other engine(s) 314. In an implementation, the data 310 of the computing system 102 may include deployment parameters 316, deployment trees 318, and other data 320.

In an example implementation of the present subject matter, the communication engine 212 of the computing system 102 may receive a workload deployment request for the deployment and execution of the workload. It would be noted that for the deployment of the workload, one or more resources 104 may be utilized. In an example implementation, the workload deployment request may include deployment details associated with the workload, along with details of the workload. The details of the workload may provide the workload information, such as workload Id. '123456', Product Name defined as 'Product", Vendor Name defined as 'VendorName1', Product Type defined as 'Application' and Product Version defined as '8.0'.

Along with the details of the workload, the deployment details may also be included within the workload deployment request. The deployment details may indicate configuration of resources to be utilized for the deployment of the workload. For example, corresponding to the workload received, the communication engine 212 may receive the following deployment details within the workload deployment request: workload Id. as '123456', Operating System as 'OS4, version 2.0', Hypervisor as 'H3, version 5.3', and storage as 'ST1'. Therefore, the deployment details may indicate that the received workload '123456' may be deployed on resources 104 where the operating system is 'OS4' with version 2.0, Hypervisor is 'H3' with version 5.3, and storage type is 'ST1'.

Based on the received deployment details, the deployment engine 108 of the computing system 102 may try to determine available interoperable resources from amongst the resources 104 of the computing network 100, for deployment of the workload. In an example implementation of the present subject matter, the deployment engine 108 may determine available resources 104 based on formation and analysis of deployment trees. In an example, the deployment trees may be stored in the computing system 102 as deployment tree 318.

A deployment tree as used herein may refer to data and/or logic that represents an order of types of resources 104 that are to be searched to find a set of interoperable resources 104. For example, the following deployment tree may represent a deployment of a workload involving deployment of an Application:

Application(s)→Operating System→Hypervisor→Server→Network→Storage

The above deployment tree denotes an order as: finding an interoperable Operating System resource 104, then an interoperable Hypervisor resource 104, then an interoperable Server resource 104, then an interoperable Network resource 104, and finally an interoperable Storage resource 104 capable of deploying the application workload. It would be noted that all the operating system resources 104 may not be interoperable with all the available hypervisor resources 104. Similarly, all the hypervisor resources 104 may not be interoperable with all the server resources 104. Therefore, a deployment tree may indicate of resources 104 which are interoperable, and can be utilized for deployment of a workload.

In an example implementation of the present subject matter, corresponding to the received workload in the workload deployment request, the deployment engine 108 may determine at least one possible deployment tree which may be utilized for the deployment and execution of the workload. That is, based on the deployment details, the deployment engine 108 may identify the possible deployment trees that may be utilized for deployment of received workload. For example, a workload may either be deployed on an operating system resource 104 'OS1, or may be deployed on an operating system resource 104 'OS2. Therefore, possible deployment trees may be determined where operating system resource 104 includes either 'OS1' or 'OS2', and is interoperable with other resources 104 to be utilized for deployment of the workload. In an example, the following four deployment trees may be identified as possible deployment trees for deployment of the received workload:

1. Application(s) (A1)→Operating System (OS1)→Hypervisor (H1)→Storage (ST2);
2. Application(s) (A1)→Operating System (OS2)→Hypervisor (H8)→Storage (ST1);
3. Application(s) (A2)→Operating System (OS1)→Hypervisor (H3)→Storage (ST1); and
4. Application(s) (A3)→Operating System (OS2)→Hypervisor (H4)→Storage (ST3).

Further, the deployment engine 108 may also identify all available deployment trees that can be formulated within the computing network 100, and can be utilized for deployment of any workload. To this end, the deployment engine 108 may identify all interoperable resources 104 within the computing network 100 and identify the available deployment trees. It would be noted that the available deployment trees within the computing network 100 may be based on the interoperability of the resources 104, and therefore, either the deployment engine 108 may generate the list of all available deployment trees based on the resources 104, or may access such information from a pre-generated list of available deployment trees corresponding to the computing network 100.

The deployment engine 108 may thereafter compare the at least one possible deployment tree with all the available deployment trees to determine whether any of the available deployment tree can be utilized to deploy the workload. In other words, based on the resources 104 to be utilized for the deployment of the workload, it is determined if any available deployment tree includes such set of resources 104, that are interoperable and can be utilized for deployment of the received workload.

In an example implementation of the present subject matter, the deployment engine 108, based on the comparison of the possible deployment trees with the available deployment trees, may determine unavailability of interoperable resources 104 to deploy the received workload.

In such a scenario where there are no available interoperable resources 104 that can deploy the received workload, the deployment engine 108 may identify at least one set of resources 104, which when modified in their configuration, may be capable of deploying the received workload. For example, if a combination of operating system resource 104 'OS1' with a Hypervisor 'H2' is not available within the resources 104, the deployment engine 108 may consider modifying configuration of a resource 104 with operating system 'OS2' to operating system 'OS1' for deployment of a workload which utilizes operating system resource 104 'OS1' with a Hypervisor 'H2' for execution.

Therefore, in operation, the deployment engine 108 may generate a first set of deployment trees such that each deployment tree within the first set of deployment trees include at least one resource 104 which can be modified in configuration for deployment of the received workload. For example, the deployment engine 108 may determine a deployment tree Application(s) (A1)→Operating System (OS4)→Hypervisor (H4)→Server (S1)→Network (N1)→Storage (ST1) to be capable of modification, such that the hypervisor resource 104 may be modified from H4 to H3. This would allow deployment of the workload which utilizes a combination of operating system resource 104 'OS4' with a Hypervisor 'H4' for deployment and execution. Therefore, the first set of deployment trees may include one or more deployment trees which may be utilized for deployment of the workload, upon modification of configuration of one or more resources.

In an implementation of the present subject matter, the deployment engine 108 may utilize any backtracking mechanism to determine the first set of deployment trees. It would be noted that the first set of deployment trees may be a subset of all the available deployment trees identified by the deployment engine 108, where by modification of configuration of one or more resources 104, the deployment tree may be utilized for the deployment of the received workload.

While modification of one resource 104 may have been described as an example, it would be noted that in a deployment tree, more than one resource 104 may also be modified in configuration to deploy the received workload. Further, it would also be noted that each deployment tree within the first set of deployment trees may have to be modified in configuration differently to deploy the workload. For example, modification of configuration of two resources 104 may be done in one deployment tree, while modification of configuration of four resources 104 may be done in another deployment tree for deployment of received workload.

In an example implementation of the present subject matter, the deployment engine 108 may rate all the deployment trees within the first set of deployment trees to select a first deployment tree for deployment of the received workload. In an implementation, the rating of the deployment trees within the first set of deployment trees may be done based on deployment parameters 316.

The deployment parameters may include at least one attribute including utilization of the plurality of resources, number of existing workloads to be migrated for deployment of the workload, number of resources to be upgraded to deploy the workload, number of resources to be downgraded to deploy the workload, and priority for deployment of the workload. In an example implementation of the present subject matter, each deployment tree within the first set of deployment trees may be rated based on each attribute of the deployment parameters.

For example, each deployment tree within the first set of deployment trees may be rated based on utilization of its resources. One deployment tree may have a 30% utilization of its resources 104, while another may have a 50% utilization of the resources. Any deployment tree with resources having lesser utilization may be rated higher to indicate its capability to accept more workload.

Similarly, for each deployment tree, the number of existing workloads that have to be migrated to accommodate the deployment of the received workload, may be determined. In an example, a deployment tree may include resources 104 such that no migration of an existing workload may have to be undertaken. However, for deployment of the received workload on another deployment tree, migration of two existing workloads may have to be undertaken. Accordingly, a deployment tree where lesser number of existing workloads may have to be migrated may be rated higher as compared to a deployment tree where more number of existing workloads may have to be migrated for deployment of the received workload.

Similarly, the deployment engine 108 may also determine the number of resources 104 that may have to be upgraded or downgraded for the deployment of the received workload on each of the deployment tree within the first set of deployment trees. A deployment tree where more number of resources 104 may have to be either upgraded or downgraded may be rated lower as compared to a deployment tree where less number of resources 104 are to be upgraded or downgraded.

In an example implementation of the present subject matter, the deployment engine 108 may also rate a deployment tree based on number of failed and successful attempts of downgrade or upgrade of its resource 104. Further, in an example implementation, apart from rating resources 104 of each deployment tree on upgrade and downgrade attempts, the deployment engine 108 may also consider last upgrade or downgrade time of the resources 104 for the purpose of rating. A deployment tree where a resource 104 was recently upgraded or downgraded may be rated lower as compared a deployment tree where a resource 104 was upgraded or downgraded relatively earlier.

In one implementation, the rating of each deployment tree may be done based on a comparative measure with respect to other available deployment trees within the first set of deployment trees. However, in another implementation, each deployment tree may be rated based on an absolute measure of rating.

Upon rating of the deployment trees based the deployment parameters, the deployment engine 108 may select a first deployment tree for deployment of the received workload. It would be noted that prior to deployment of the received workload, one or more resources 104 of the first deployment tree may be upgraded or downgraded. Based on selection of the first deployment tree for deployment of the received workload, a set of resources may be identified that may provide optimally deploy and execute the received workload.

As described earlier, the deployment engine 108 of the computing system 102 may also determine a set of resources 104 for migration of an existing workload. In such scenarios, the deployment engine 108 may identify deployment trees on which the existing workload may be migrated for deployment, if one or more resources are modified in configuration. Such identified deployment trees may also be rated based on the deployment parameters to identify a most suitable deployment tree for migration of the existing workload.

Figure 4:
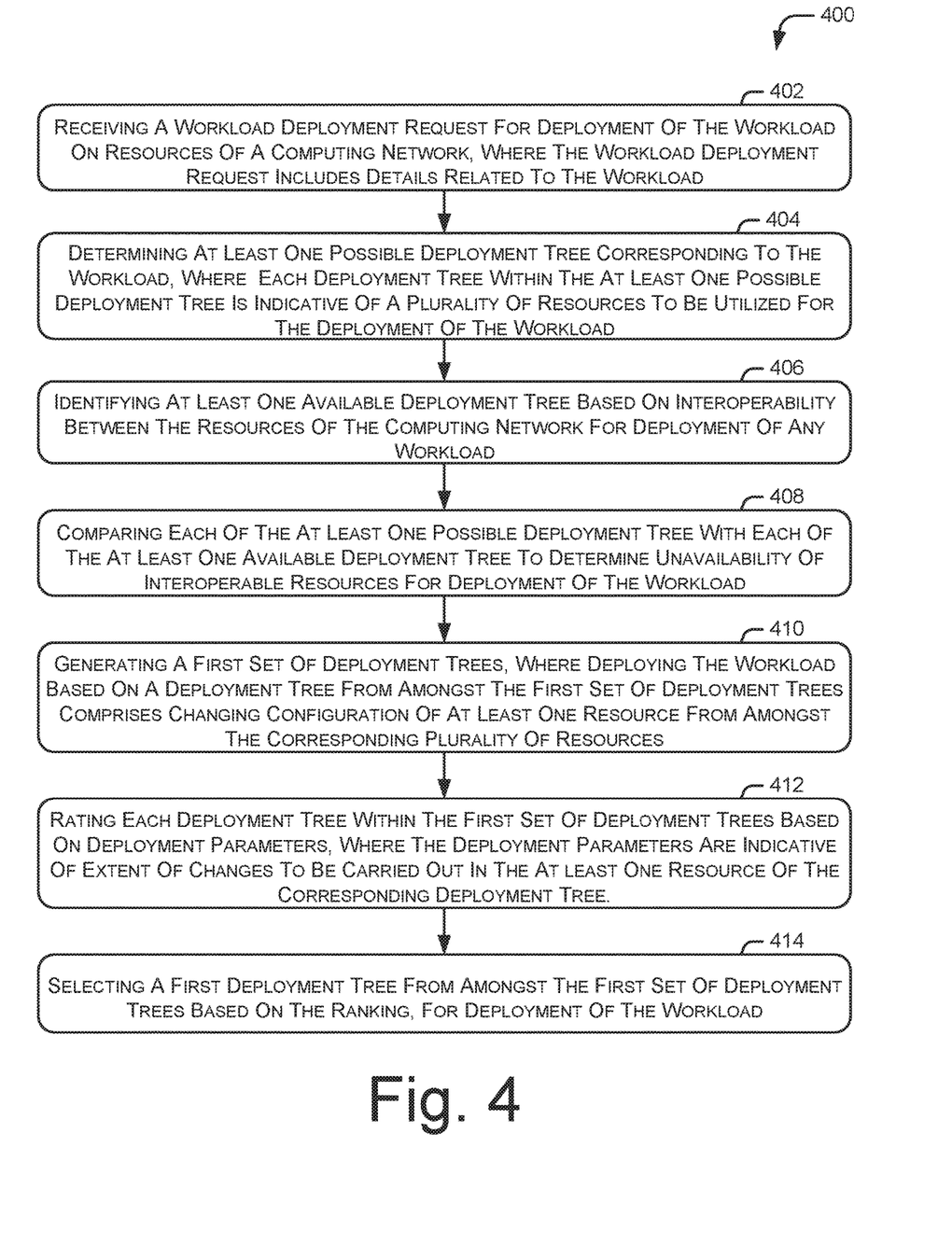
FIG. 4 is a flowchart representative of an example method of workload deployment in the computing network, according to an example implementation of the present subject matter.

FIG. 4 illustrates a method 400 for workload deployment in a computing network 100, according to an implementation of the present subject matter. The order in which the method 400 is described is not intended to be construed as a limitation, and any number of the described method blocks may be combined in any order to implement the method 400, or an alternative method. Furthermore, the method 400 may be implemented by processor(s) or computing device(s) through any suitable hardware, non-transitory machine readable instructions, or combination thereof.

It may be understood that steps of the method 400 may be performed by programmed computing devices. The steps of the method 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, although the method 400 may be implemented in a variety of elements of the computing network 100; in an example implementation of FIG. 4, the method 400 may be explained in context of aforementioned computing system 102 and resources 104, of the computing network 100, for the ease of explanation.

Referring to FIG. 4, in an example implementation of the present subject matter, at block 402, a workload deployment request is received for deployment of a workload on resources 104 of the computing network 100. In an example implementation, the workload deployment request may include deployment details related to the workload.

At block 404, at least one possible deployment tree corresponding to the workload is determined. Each deployment tree amongst the at least one possible deployment tree is indicative of resources 104 to be utilized for the deployment of the workload. For example, the computing system 102 may choose a set of resources 104 corresponding to a deployment tree as it is understood that the deployment tree is a set of resources 104.

At block 406, at least one available deployment tree is identified based on interoperability between the resources 104 of the computing network 100, for deployment of any workload. For example, the computing system 102 may identify at least one available deployment tree, where each resource 104 within each deployment tree is interoperable and may deploy a workload for execution.

At block 408, each of the at least one possible deployment tree is compared with each of the at least one available deployment tree to determine unavailability of interoperable resources for deployment of the workload received in the workload deployment request.

At block 410, a first set of deployment trees is generated, where deploying the workload based on a deployment tree from amongst the first set of deployment trees comprises changing configuration of at least one resource 104 from amongst the corresponding plurality of resources 104 within the deployment tree. For example, one of the resources 104 may undergo a change in configuration for making the resource 104 interoperable with other resources 104, for the deployment of the workload received.

At block 412, each deployment tree within the first set of deployment trees is rated based on deployment parameters. The deployment parameters are indicative of extent of changes to be carried out in the at least one resource 104 of the corresponding deployment tree. For example extent of changes in a resource 104 may include upgrading, downgrading, migration of existing workloads, etc.

At block 414, a first deployment tree may be selected from amongst the first set of deployment trees based on the ranking, for deployment of the workload.

Figure 5:
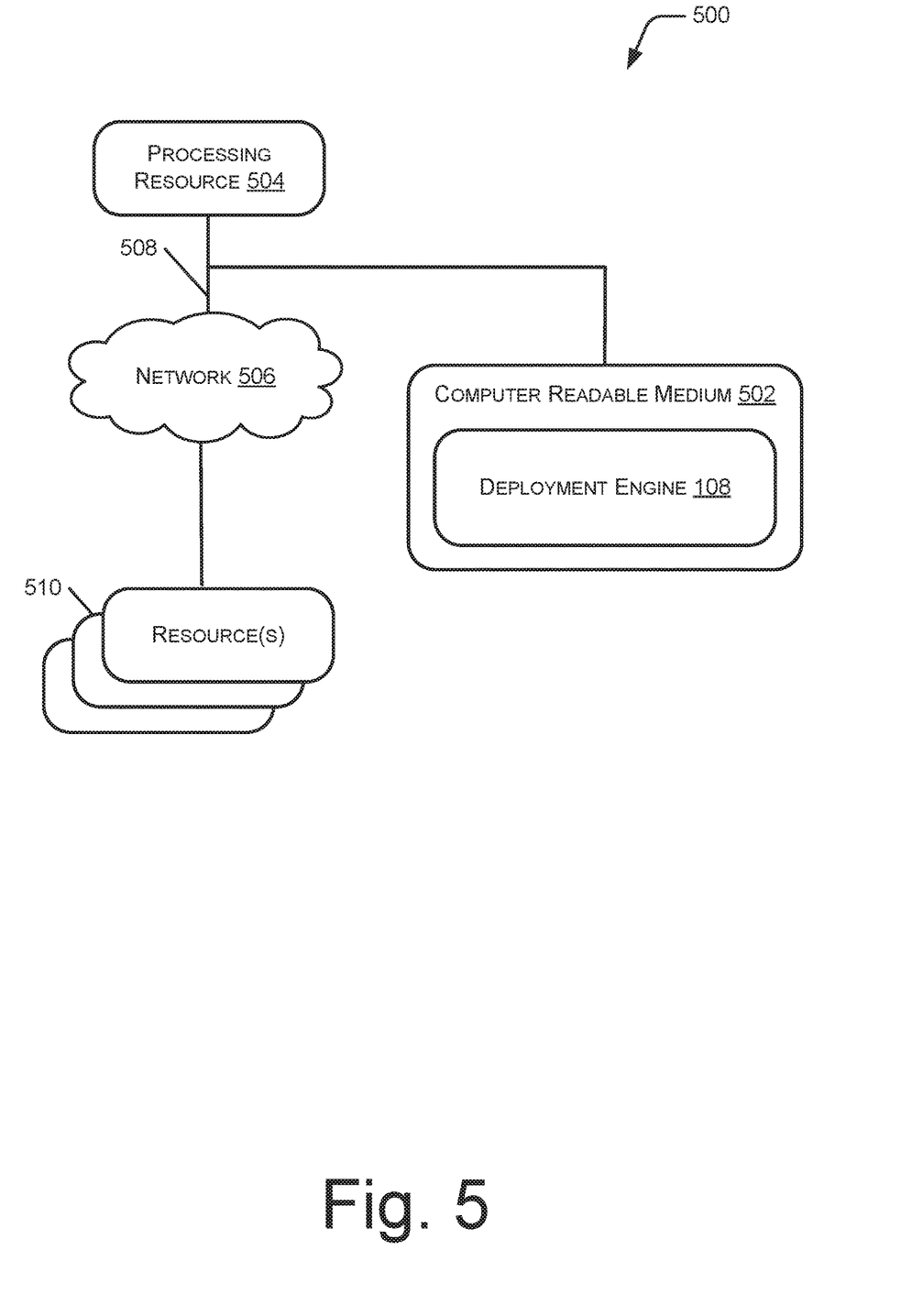
FIG. 5 illustrates an example computing network, implementing an example non-transitory computer-readable medium for deployment of workloads in the computing network.

FIG. 5 illustrates an example computing network 100, implementing a non-transitory computer-readable medium 502 for deployment of workloads, according to an implementation of the present subject matter. In one implementation, the non-transitory computer readable medium 502 may be utilized by a computing system, such as the computing system 102 (not shown). The computing system 102 may be a part of the computing network 100 and be implemented in a public networking environment or a private networking environment. In one implementation, the computing network 100 includes a processing resource 504 communicatively coupled to the non-transitory computer readable medium 502 via a network 506, through a communication link 508.

For example, the processing resource 504 may be implemented in a computing system, such as the computing system 102 described earlier. The computer readable medium 502 may be, for example, an internal memory device or an external memory device. In one implementation, the communication link 508 may be a direct communication link, such as any memory read/write interface. In another implementation, the communication link 508 may be an indirect communication link, such as a network interface. In such a case, the processing resource 504 may access the computer readable medium 502 through the network 506. The network 506 may be a single network or a combination of multiple networks and may use a variety of different communication protocols.

The processing resource 504 and the computer readable medium 502 may also be communicating with resources 510 over the network 506. The resources 510 may be computing devices, servers, applications, etc., that communicate with the computer readable medium 502 and the processing resource 504. The resources 510 may include applications that communicate with the processing resource 504 and the computer readable medium 502, in accordance with an example of the present subject matter.

In one implementation, the computer readable medium 502 includes the deployment engine 108. The deployment engine 108 may be accessed by the processing resource 504 through the communication link 508 and subsequently executed to deploy workloads.

In an example implementation of the present subject matter, the deployment engine 108 of the computer readable medium 502 may receive a workload deployment request for deployment of a workload on resources 510. The workload deployment request may include deployment details related to the workload and workload details.

The deployment engine 108 may also determine unavailability of interoperable resources for deployment of the workload based on comparing each of at least one possible deployment tree with each of at least one available deployment tree, where each deployment tree within the at least one possible deployment tree is indicative of a plurality of resources 104 to be utilized for the deployment of the workload; and where each deployment tree within the at least one available deployment tree is indicative of available deployment trees for deployment of any workload.

The deployment engine 108 may then generate a first set of deployment trees based on a backtracking mechanism, where each deployment tree within the first set of deployment trees is indicative of deployment of the workload by changing configuration of at least one resource from amongst the corresponding plurality of resources 104 and select a first deployment tree from amongst the first set of deployment trees based on deployment parameters.

Although implementations of workload deployment have been described in language specific to structural features and/or methods, it is to be understood that the present subject matter is not necessarily limited to the specific features or methods described. Rather, the specific features and methods are disclosed and explained in the context of a few implementations for workload deployment in a computing network.

What is claimed is:

1. A computing system comprising:
    a hardware processor;
    a communication engine communicatively coupled to the processor to receive a workload deployment request for deployment of a workload on a plurality of resources of a computing network, wherein the workload deployment request includes deployment details related to the workload; and
    a deployment engine communicatively coupled to the processor to:
        determine an unavailability of interoperable resources for deployment of the workload based on interoperability information associated with each resource of the plurality of resources;
        identify a plurality of resource sets from the plurality of resources for deployment of the workload, wherein deploying the workload on the plurality of resource sets comprises changing a configuration of a resource included within the plurality of resource sets;
        rate the plurality of resource sets based on deployment parameters, wherein the deployment parameters include:
            an amount of failed and successful attempts of upgrades and downgrades; and
            a time of a most recent successful upgrade attempt and a time of a less recent successful upgrade, wherein the resource set having the less recent time of the successful upgrade is rated higher than the time of the most recent successful upgrade;
        determine an amount of existing workloads to be migrated from a first set of resources to a second set of resources to accommodate the deployment request of the workload; and
        select the first set of resources from amongst the plurality of resource sets for deployment of the workload based on the rating of the plurality of resource sets.

2. The computing system as claimed in claim 1, wherein the deployment parameters further include at least one of utilization of the plurality of resources, the amount of existing workloads to be migrated for deployment of the workload, an amount of resources to be upgraded to deploy the workload, an amount of resources to be downgraded to deploy the workload, and a priority for deployment of the workload or combinations thereof.

3. The computing system as claimed in claim 1, wherein the deployment engine is to further change configuration of the resource within the first set of resources.

4. The computing system as claimed in claim 1, wherein the deployment engine is to analyze the interoperability of the resources based on interoperability information expressed in an open interoperability format (OIF).

5. A method for deployment of a workload in a computing network, the method comprising:
    determining a plurality of possible deployment trees corresponding to the workload, wherein the determined plurality of possible deployment trees is indicative of a plurality of resources of the computing network to be utilized for the deployment of the workload;
    identifying a plurality of available deployment trees based on an interoperability between the plurality of resources for deployment of any workload;
    comparing the plurality of possible deployment trees with the plurality of available deployment trees to determine an unavailability of the interoperable resources for deployment of the workload;
    generating a first set of deployment trees from the comparison;
    rating each deployment tree of the first set of deployment trees based on deployment parameters, wherein the deployment parameters include:
        an amount of failed and successful attempts of upgrades and downgrades; and
        a time of a most recent successful upgrade attempt and a time of a less recent successful upgrade, wherein a deployment tree having the less recent time of the successful upgrade is rated higher than the time of the most recent successful upgrade;
    determine an amount of existing workloads to be migrated from a first deployment tree to a second deployment tree to accommodate the deployment of the workload; and
    selecting the first deployment tree from amongst the first set of deployment trees based on the rating, for deployment of the workload.

6. The method as claimed in claim 5, wherein the method further comprises changing configuration of the resource associated with the first deployment tree.

7. The method as claimed in claim 6, wherein changing the configuration of the resource comprises upgrading firmware associated with the resource.

8. The method as claimed in claim 5, wherein the deployment parameters further include at least one of utilization of the plurality of resources, the amount of existing workloads to be migrated for deployment of the workload, an amount of resources to be upgraded to deploy the workload, an amount of resources to be downgraded to deploy the workload, and a priority for deployment of the workload or combinations thereof.

9. The method as claimed in claim 5, wherein the first deployment tree has a lesser rating from amongst the rating of the first set of deployment trees.

10. The method as claimed in claim 5, wherein the interoperability between the plurality of resources is determined based on interoperability information associated with each resource of the plurality of resources included in the computing network.

11. The method as claimed in claim 10, wherein the interoperability information is expressed in an open interoperability format (OIF).

12. The methods as claimed in claim 5, wherein the plurality of resources included in the computing network include at least one of a hardware resource and a software resource.

13. The method as claimed in claim 5, wherein generating the first set of deployment trees is based on a backtracking mechanism.

14. A non-transitory computer-readable medium comprising instructions for a computing resource, executable by a processing resource to:

receive a workload deployment request for deployment of a workload on a plurality of resources of a computing network, wherein the workload deployment request includes deployment details related to the workload;

determine an unavailability of interoperable resources for deployment of the workload based on comparing a plurality of possible deployment trees with a plurality of available deployment trees; wherein a possible deployment tree of the plurality of possible deployment trees is indicative of the plurality of resources to be utilized for the deployment of the workload; and wherein an available deployment tree of the plurality of available deployment trees is indicative of available deployment trees for deployment of any workload;

determine an amount of existing workloads to be migrated from a first deployment tree to a second deployment tree to accommodate the deployment request of the workload; and select the first deployment tree from amongst a first set of deployment trees based on deployment parameters, wherein the deployment parameters are based on an amount of failed and successful attempts of upgrades and downgrades, a time of a most recent successful upgrade attempt and a time of a less recent successful upgrade, wherein the deployment parameter having the less recent time of the successful upgrade is rated higher than the time of the most recent successful upgrade.

15. The non-transitory computer-readable medium as claimed in claim 14, the computer-readable medium comprising instructions for a computing resource to further change configuration of the resource associated with the first deployment tree.

* * * * *